United States Patent [19]

Vayenas et al.

[11] 4,272,336

[45] Jun. 9, 1981

[54] METHOD AND APPARATUS FOR FORMING NITRIC OXIDE FROM AMMONIA

[75] Inventors: Costas G. Vayenas, Wellesley Hills, Mass.; David E. Ortman, Rochester, N.Y.

[73] Assignee: Massachusetts Institute of Technology, Cambridge, Mass.

[21] Appl. No.: 61,373

[22] Filed: Jul. 27, 1979

[51] Int. Cl.³ .................. C25B 1/00; C01B 21/26; C01B 21/28; H01M 8/12
[52] U.S. Cl. .................. 204/59 R; 204/DIG. 3; 423/403; 429/33
[58] Field of Search .................. 423/403; 204/DIG. 4, 204/DIG. 3, 59 R; 429/30-33

[56] References Cited

U.S. PATENT DOCUMENTS

| | | | |
|---|---|---|---|
| 3,103,473 | 9/1963 | Juda | 204/77 |
| 3,103,474 | 9/1963 | Juda | 204/104 |
| 3,300,344 | 1/1967 | Bray et al. | 429/33 |
| 3,350,230 | 10/1967 | Tannenberger et al. | 429/33 |
| 3,368,922 | 2/1968 | Salyer | 429/33 |
| 3,931,051 | 1/1976 | Dubler | 423/403 X |
| 4,175,165 | 11/1979 | Adlhart | 429/30 |

FOREIGN PATENT DOCUMENTS 2851821  5/1979  Fed. Rep. of Germany ............ 423/403

OTHER PUBLICATIONS

Archer et al., Advance in Chemistry, Series 47, pp. 332-342 (1965).
Wynveen, Fuel Cells, pp. 153-166, pub. by Reinhold Pub. Corp., New York (1963).
Eisenberg, Proc. Ann. Power-Sources Congress, vol. 18, pp. 20-24 (1964).

Primary Examiner—F. Edmundson
Attorney, Agent, or Firm—Arthur A. Smith, Jr.; Paul J. Cook

[57] ABSTRACT

Nitric oxide is formed by the oxidation of ammonia. An ammonia containing gas is contacted with an oxidation catalyst deposited on a surface of a solid electrolyte while an oxygen containing gas is contacted with a second catalyst capable of dissociating oxygen gas to oxygen ion deposited upon a second surface of the solid electrolyte. Oxygen ion is transported through the solid electrolyte to react with ammonia to form nitric oxide under simultaneous production of electric energy.

10 Claims, 4 Drawing Figures

METHOD AND APPARATUS FOR FORMING NITRIC OXIDE FROM AMMONIA

The Government has rights in this invention by virtue of Grant No. Eng. 77-27500 from the National Science Foundation and IPA-0010.

BACKGROUND OF THE INVENTION

This invention relates to a method and apparatus for oxidizing ammonia to form nitric oxide.

Presently, nitric acid ranks tenth among all chemicals produced in this country with a current production rate of about 6.8 million tons per year. Ammonia oxidation to form nitric oxide from which nitric acid is produced presently is the only economic method for producing nitric acid. The oxidation of ammonia is a highly exothermic oxidation reaction wherein enormous amounts of chemical energy are transformed into thermal energy. It would be desirable to recover the energy of the reaction as electrical energy rather than thermal energy since electrical energy is far more useful in applications other than maintaining the oxidation reaction. In addition, the direct recovery of electrical energy would eliminate presently required steps for converting the thermal energy into electrical energy. In addition, it would be desirable to provide such a process which effects substantially complete conversion of ammonia to nitric oxide without the formation of undesirable by-products such as nitrous oxide, nitrogen and/or hydroxylamine.

SUMMARY OF THE INVENTION

This invention provides a means for oxidizing ammonia to form nitric oxide selectively and comprises a plurality of electrolytic cells. Each cell comprises a solid electrolyte capable of transporting oxygen ion which electrolyte is coated on opposing surfaces with a first catalyst and a second catalyst. The first catalyst which is capable of dissociating oxygen gas into oxygen ions is contacted with a stream of oxygen-containing gas. The second catalyst is capable of promoting the oxidation of ammonia and is contacted with an ammonia-containing feed stream. The oxygen ions pass through the solid electrolyte into the second catalyst and are reacted with ammonia to form the nitric oxide. The ammonia-containing gas is pre-heated to a temperature so that the oxidation reaction can be initiated and maintained. By virtue of the oxygen ion transport through the solid electrolyte, a net production of electricity is effected and can be recovered by attaching electrical leads to each catalyst deposited on the solid electrolyte. A portion of the electrical energy can be converted to thermal energy in order to support and maintain the oxidation reaction.

This invention provides substantial operating advantages over the prior art techniques for oxidizing ammonia to form nitric oxide. The primary advantage is that the process of this invention effects a net production of electrical energy which can be recovered and utilized as desired.

DETAILED DESCRIPTION OF SPECIFIC EMBODIMENTS

Figure 1:
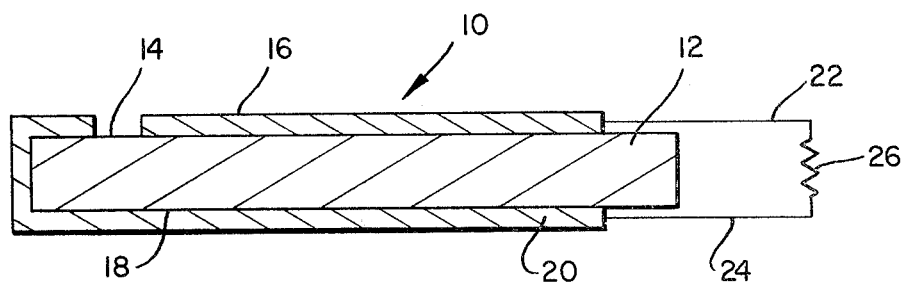
FIG. 1 is a side view, in cross-section of an apparatus suitable for carrying out the process of this invention.

This invention provides an apparatus for effecting oxidation of ammonia which includes at least one solid electrolyte capable of transporting oxygen ion; each solid electrolyte being coated on one side with a first catalytic material capable of dissociating oxygen to form oxygen ion. Each solid electrolyte also is coated on a second surface with a catalytic material capable of promoting the oxidation of ammonia. Feed gases are introduced into the reactor so that an oxgyen-containing feed gas contacts the first catalyst while an ammonia-containing feed gas contacts the second catalyst. In addition, sealing means are provided so that the oxygen-containing gas and the ammonia-containing gas are not admixed. Oxidation of the ammonia occurs adjacent the second catalyst to form nitric oxide which then is recovered from the ammonia-containing gas. The elements comprising the solid electrolyte are formed in a manner so as to define channels which are exposed only to either the first catalyst or to the second catalyst and so that channels exposed only to the first catalyst are positioned adjacent channels exposed only to the second catalyst. Thus, oxygen converted to oxygen ions by virtue of contact with the first catalyst migrate through the solid electrolyte to contact the second catalyst which promotes ammonia oxidation. For example, the solid electrolyte can be in the form of hollow tubes, the inner surface of which is coated with one catalyst while the outer surface tube is coated with the second catalyst. Alternatively, the solid electrolyte can be formed into thin plates which are arranged within a reactor shell to form channels as described above.

Reaction to form nitric oxide occurs within the portions of the reactor to which has been introduced the ammonia-containing feed gas. Generally, reaction occurs at a temperature between about 500° C. and about 1000° C., preferably between about 600° C. and about 850° C. It is desirable to maintain the temperature above 500° C. in order to substantially reduce or eliminate the chances of forming nitrogen and nitrous oxide. It is also desirable to effect the conversion below about 1000° C. in order to minimize or prevent the formation of undesirable nitrous oxide and hydroxylamine. Generally, reaction can be effected in the presence of an inert diluting gas admixed with the ammonia feed gas in order to reduce or eliminate the possibility of explosive reactions. Suitable inert gases include helium, argon or the like. Generally, dilution can be effected so that the resultant diluted gas contains between about 1 and 100 volume percent ammonia based upon the total volume of the ammonia-containing feed gas. Trace amounts of oxygen, typically less than 0.5%, can be also admixed with the diluent gas as they under certain circumstances increase the selectivity without severely decreasing the electric power output.

Any solid electrolyte capable of transporting oxygen ions under the reaction conditions suitable for forming nitric oxide from ammonia can be utilized herein. Typically, oxygen ion conducting solid electrolytes are solid solutions formed between oxides containing divalent and trivalent cation such as CaO, $Sc_2O_3$, $Y_2O_3$, $La_2O_3$ or the like with oxides containing tetravalent cations such as $ZrO_2$ $ThO_2$ and CeO. Their higher ionic conductivity is due to the existence of $O^{--}$ site vacancies. One $O^{--}$ vacancy occurs for each divalent or each two trivalent cations that are substituted for a tetravalent ion in the lattice. Of particular interest is a solid solution containing about 15 mol. percent CaO in $ZrO_2$ (calcia stabilized zirconia) or a solid solution containing about 8 mol. percent $Y_2O_3$ in $ZrO_2$ (yttria stabilized zirconia). These latter two solid electrolytes are characterized by their high ionic conductivity, their pure oxygen ion conduction over wide ranges of temperature and oxygen pressure and their relatively low cost.

Representative catalytic materials useful for decomposing oxygen to oxygen ion are platinum, platinum-rhodium alloy, gold, silver, or the like. Representative suitable catalysts useful for promoting the oxidation of ammonia include platinum, platinum-rhodium alloy, platinum-rhodium-palladium alloy or the like. The catalyst composition can be deposited on the solid electrolyte by any conventional means including precipitation from solution, paste application or vapor deposition. The preferred catalyst to effect oxygen ion formation and ammonia oxidation comprises a platinum-rhodium alloy containing between about five and fifteen weight percent rhodium since this catalyst is effective in promoting the desired reactions and is capable of withstanding the reaction conditions encountered over long periods of time. The rhodium provides little catalytic activity but serves to stabilize the platinum under the reaction conditions.

The present invention provides substantial advantages over the processes for converting ammonia to nitric oxide. Through the use of this invention, a significant portion of the Gibbs free energy change of the chemical reaction is converted into electrical energy, i.e., in order of about 60–70% of the Gibbs free energy. In accordance with this invention, a portion of the Gibbs free energy is converted to thermal energy in order to maintain the reaction temperature between about 500° C. and about 1000° C. The remaining portion of the Gibbs free energy is converted to electrical energy at a power output in the order of 0.1 watts per $cm^2$ of catalyst-coated solid electrolyte surface.

Referring to FIG. 1, a coated solid electrolyte useful in the process and apparatus of this invention is shown. As shown, the active element 10 comprises a core 12 formed of the solid electrolyte which is coated on one surface 14 with a catalyst 16 useful for converting oxygen gas to oxygen ion. The solid electrolyte 12 is coated on a second surface 18 with a second catalyst 20 which promotes the oxidation of ammonia to form nitric oxide. An electrical lead 22 is connected to catalyst 16 and electrical lead 24 is connected to catalyst 20. Oxygen gas which contacts catalyst 16 is converted to oxygen ion which migrates through solid electrolyte 12 to contact catalyst 20. At the surface of catalyst 20, the oxygen ion is converted to oxygen gas and reacts with the ammonia contacting catalyst 20 to form nitric oxide. During this reaction, the oxygen ion gives up two electrons which travel through the circuit formed by lead 24, electrical load 26 and lead 22 back to catalyst 16.

Figure 2:
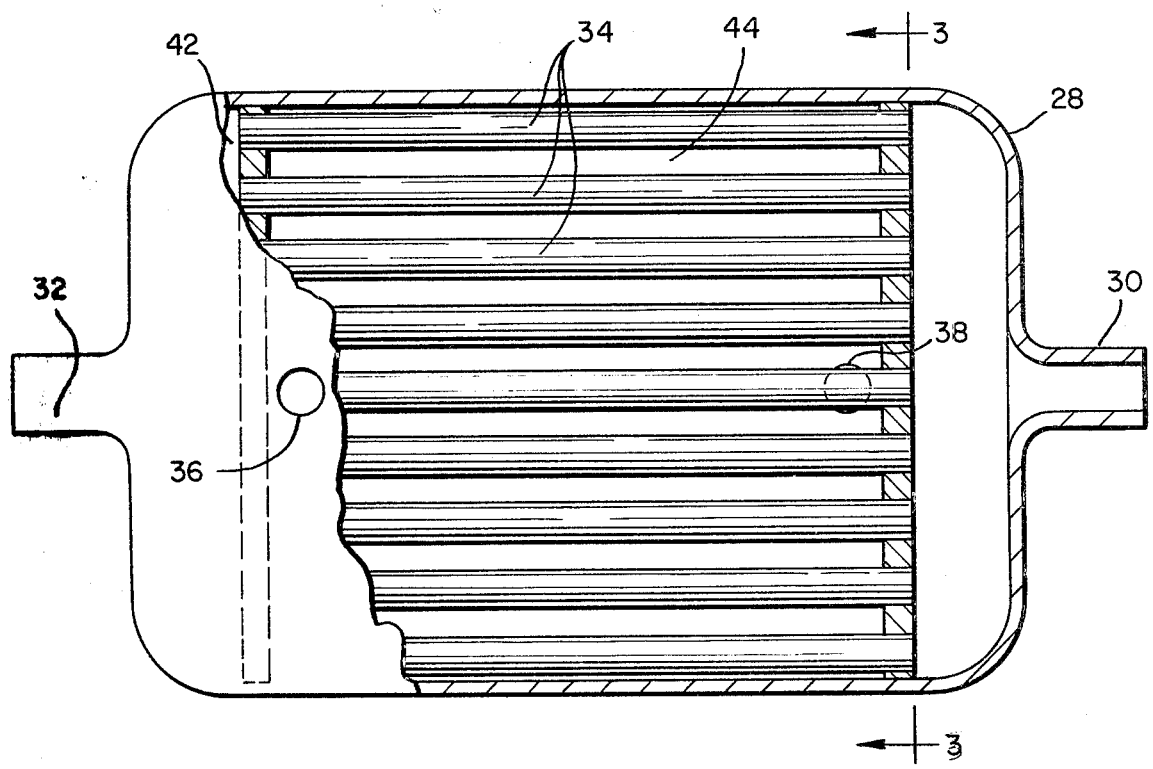
FIG. 2 is a cross-sectional view taken along line 2—2 of FIG. 1.
Figure 3:
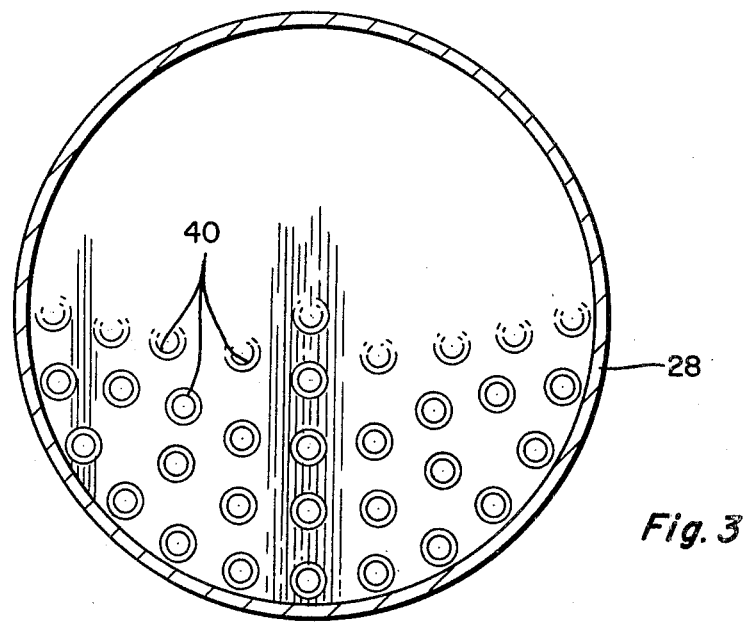
FIG. 3 is a side view, in cross-section of an alternative reactor means for carrying out the process of this invention.

The reactor apparatus shown in FIGS. 2 and 3 comprises a shell 28 having an inlet 30 and an outlet 32. Within the shell 28 are located a plurality of tubes 34 formed from a solid electrolyte capable of transporting oxygen ions. The interiors of tubes 34 are coated with a catalyst suitable for converting oxygen gas to oxygen ion while the exteriors of tubes 34 are coated with a catalyst suitable for promoting the oxidation of ammonia to form nitric oxide. The shell 28 is provided with a second inlet 36 and a second outlet 38 which second inlet and second outlet comprise the means for introducing an ammonia-containing gas into the shell 28 to contact the exterior of tubes 34. The inlet 30 and the outlet 32 are adapted to permit passage of an oxygen-containing gas such as air into the plenum 38 through the tube inlets 40, into plenum 42 and out through outlet 32. The second inlet 36 and the second outlet 38 are adapted to permit passage of an ammonia-containing gas into chamber 44 to contact the second catalyst coated on the outer surface of tubes 34 thereby to effect production of nitric oxide which is then removed from the reactor through a second outlet 38.

Figure 4:
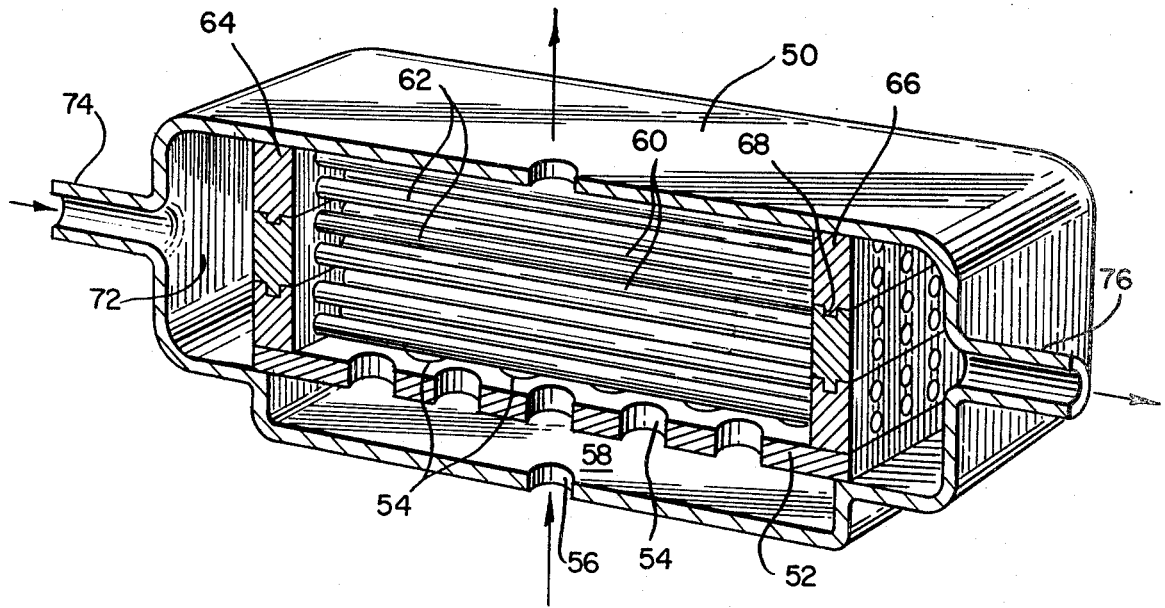
FIG. 4 is a side cross-sectional view of an alternative reactor means for carrying out the process of this invention.

FIG. 4 shows an alternative reactor construction useful in the present invention. The reactor comprises a shell 50 which houses a plate 52 having a plurality of holes 54 therein. The plate 52 extends above the entire internal cross-section of the shell 50 so that any gas entering through inlet 56 into plenum 58 must pass through the holes 54 in order to pass into chamber 60. The hollow tubes 62 are coated on the exterior and the interior surfaces with catalysts as described above in order to effect oxidation of ammonia to nitric oxide. Tubes 62 extend across chamber 60 and are attached to plates 64 and 66. The plates 64 and 66 have a cross-section such as the tongue and groove shape 68 shown so that when the plates are placed upon each other, they form a seal between the plenum chamber 70 and the chamber 60 as well as the plenum chamber 72 and the chamber 60. An oxygen-containing gas enters inlet 74, passes through tubes 62 and exits through outlet 76. An ammonia-containing gas passes through inlet 56 into plenum 58, through openings 54 into chamber 60 and out outlet 78 to a means (not shown) for recovering nitric oxide upon the ammonia-containing gas.

Figure 5:
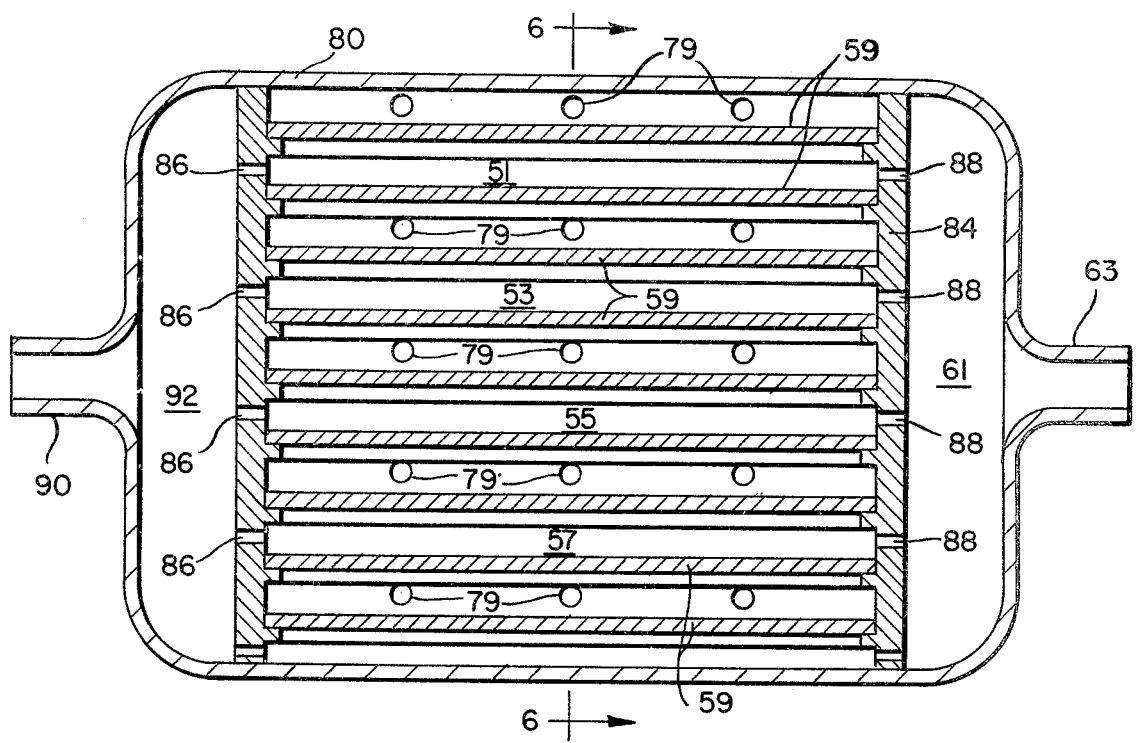
FIG. 5 is a cross-sectional view of an alternative reactor useful for carrying out the present invention.
Figure 6:
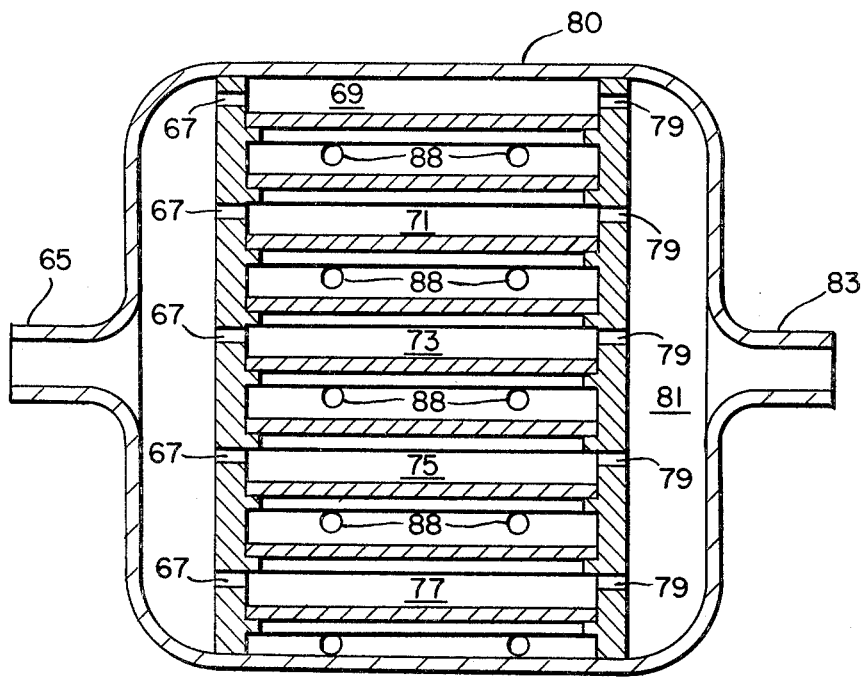
FIG. 6 is a cross-sectional view of the reactor of FIG. 5 taken along lines 6—6.

The reactor shown in FIGS. 5 and 6 utilizes a solid electrolyte in the form of plates rather than tubes. The reactor comprises a shell 80 having plates 82 and 84 provided with inlets 86 and outlets 88. Oxygen-containing gas enters the shell 80 through inlet 90, passes through plenum chamber 92 through inlets 86 and into chambers 51, 53, 55 and 57 to contact the catalyst on the plates 59. The oxygen-depleted gas passes through exits 88 into plenum 61 and out through outlet 63. An ammonia-containing gas enters shell 80 through inlet 65, passes through inlet 67 and into chambers 69, 71, 73, 75 and 77. In chambers 69 through 77, the ammonia-containing gas is converted to a nitric oxide and the resultant gas product passes through exits 79 into plenum 81 and through outlet 83.

In the manner shown in FIG. 1, suitable electrical leads are attached to each of the catalytic surfaces of the reactor shown in FIGS. 2 through 6 in order to recover the electrical energy produced. Any conventional means for separating nitric oxide from unconverted ammonia can be utilized in the present invention.

We claim:

1. The process for oxidizing ammonia to form nitric oxide which comprises passing an ammonia-containing feed gas at a temperature between about 500° C. and about 1000° C. in contact with a first catalyst deposited on a first surface of a solid electrolyte and passing an oxygen-containing gas in contact with a second catalyst deposited on a second surface of said solid electrolyte, said first catalyst being capable of promoting the oxidation of ammonia to nitric oxide, said second catalyst being capable of dissociating oxygen gas to form oxygen ions, said solid electrolyte being capable of transporting said oxygen ions to contact said ammonia to form nitric oxide.

2. The process of claim 1 wherein said solid electrolyte comprises yttria stabilized zirconia.

3. The process of any one of claims 1 or 2 wherein said first catalyst comprises a platinum-containing metal composition.

4. The process of any one of claims 1 or 2 wherein said second catalyst comprises a platinum-containing metal composition.

5. The process of any one of claims 1 or 2 wherein said first catalyst and said second catalyst each comprise a platinum-containing metal composition.

6. The process of claim 1 wherein said solid electrolyte comprises calcia stabilized zirconia.

7. The process of claim 6 wherein said first catalyst comprises a platinum-containing metal composition.

8. The process of claim 6 wherein said second catalyst comprises a platinum-containing metal composition.

9. The process of claim 1 wherein said first catalyst and said second catalyst each comprise a platinum-containing metal composition.

10. The process of any one of claims 1, 2, 6, 7, 8 or 9 wherein the temperature of said ammonia is between about 600° C. and 850° C.

* * * * *